United States Patent

Kaiser et al.

[11] Patent Number: 5,563,344
[45] Date of Patent: Oct. 8, 1996

[54] DUAL ELEMENT ELECTRON TUNNELING ACCELEROMETER

[75] Inventors: William J. Kaiser, West Covina; Thomas W. Kenny, Glendale; Howard K. Rockstad, Thousand Oaks; Joseph K. Reynolds, Pasadena; Thomas R. Van Zandt, Redondo Beach, all of Calif.

[73] Assignee: California Institute of Technology, Pasadena, Calif.

[21] Appl. No.: 493,432

[22] Filed: Jun. 22, 1995

Related U.S. Application Data

[63] Continuation of Ser. No. 967,413, Oct. 28, 1992, abandoned.

[51] Int. Cl.$^6$ ..................... G01P 15/13
[52] U.S. Cl. ............... 73/514.24; 73/514.21; 73/514.36
[58] Field of Search ............... 73/505, 517 R, 73/517 A, 517 B, 514.17, 514.18, 514.21, 514.24, 514.36

[56] References Cited

U.S. PATENT DOCUMENTS

| | | | |
|---|---|---|---|
| 3,723,866 | 3/1973 | Michaud et al. | 324/61 R |
| 4,364,008 | 12/1982 | Jacques | 324/58.5 |
| 4,675,670 | 6/1987 | Lalonde et al. | 340/870.37 |
| 4,823,230 | 4/1989 | Tiemann | 73/724 |
| 5,008,774 | 4/1991 | Bullis et al. | 73/517 R |
| 5,009,111 | 4/1991 | West | 73/514.17 |
| 5,211,051 | 5/1993 | Kaiser | 73/1 D |
| 5,263,470 | 11/1993 | Kaiser | 73/178 R |

*Primary Examiner*—Hezron E. Williams
*Assistant Examiner*—Christine K. Oda
*Attorney, Agent, or Firm*—Leonard Tachner

[57] ABSTRACT

The use of a dual element approach provides high resolution position sensors based on electron tunneling. This approach allows miniaturization while utilizing the position sensitivity of electron tunneling to give high resolution. The dual-element tunneling structure overcomes the narrow bandwidth limitations of a single-element structure. A sensor with an operating range of 5 Hz to 10 kHz, which can have applications as an acoustic sensor, is disclosed. Noise is analyzed for fundamental thermal vibration of the suspended masses and is compared to electronic noise. It is shown that miniature tunnel accelerometers can achieve resolution such that thermal noise in the suspended masses is the dominant cause of the resolution limit. With a proof mass of order 100 mg, noise analysis predicts limiting resolutions approaching $10^{-9}$ g/$\sqrt{Hz}$ in a 300 Hz band and $10^{-8}$ g/$\sqrt{Hz}$ at 1 kHz.

2 Claims, 2 Drawing Sheets

5,563,344

DUAL ELEMENT ELECTRON TUNNELING ACCELEROMETER

This is a continuation of copending application Ser. No. 07/967,413 filed on Oct. 28, 1992 abandoned.

ORIGIN OF INVENTION

The invention described herein was made in the performance of work under a NASA contract, and is subject to the provisions of Public Law 96-517 (35 USC 202) in which the Contractor has elected to retain title.

TECHNICAL FIELD

The present invention relates generally to motion sensors and more specifically, to a sensitive, miniature accelerometer that has the potential for widespread use in many applications. The instrument is based upon a wide bandwidth transducer wherein separately suspended transducer element and proof mass permit independent optimization to minimize volume and yet provide extreme sensitivity over a broad frequency range.

BACKGROUND ART

The need for compact, low cost, high sensitivity wide bandwidth accelerometers is strongly felt in a number of scientific and technical fields. Among the applications are vehicle health monitoring, guidance and control, acceleration measurement in microgravity experiments, detection of underwater acoustics and seismology. For many of these applications, recent work has been focused on miniaturization to allow new deployment scenarios, and to allow use of low-cost fabrication techniques such as silicon micromachining.

It is important to consider the fundamental principles of accelerometers. A simple accelerometer consists of a spring supported proof mass, with damping, and a position sensor for measuring the displacement of the proof mass relative to the support structure. In this simple accelerometer, only the proof mass is spring-suspended from the support structure; this is called a "single-element structure". The spring-proof mass system is characterized by a natural frequency $$\omega_o = \sqrt{\frac{k}{m}} \quad (1)$$

where k is the spring constant and m is the proof mass. For frequencies below this natural frequency, the displacement of the proof mass relative to a support, $x_r$, is given by $$x_r = \frac{a_s}{\omega_o^2} \quad (2)$$

where $a_s$ is the acceleration of the support structure. In this frequency range, therefore, the mechanical system acts as an acceleration-to-displacement transducer. The displacement is measured with a position sensor. The output of the position sensor is dependent upon $a_s$, and thus serves as a measure of the acceleration of the support structure. For a given sensitivity of the position sensor, equation (1) indicates that the acceleration sensitivity of the device can be improved by reducing $\omega_o$, either by softening the support spring or by increasing the proof mass. Normally accelerometer dynamics are constrained in the following manner. The minimum acceleration to be detected determines the required resolution. The displacement resolution available from the best transducer for the particular application determines the minimum displacement to be detected. Using Equation 2, the upper limit on the resonant frequency of the proof mass is then determined. For example, an acceleration resolution of $10^{-8}$ g/$\sqrt{Hz}$ and a displacement resolution of $10^{-3}$ Å/$\sqrt{Hz}$ require a resonant frequency less than 150 Hz.

For many applications, it is necessary to impose force-feedback control of the transducer to provide linear response over a wide dynamic range. In normal accelerometers, this is accomplished by feedback-controlling the position of the proof mass. However, this is difficult in the case of high sensitivity, wide-bandwidth accelerometers because the feedback system becomes unstable at the resonant frequency of the proof mass. If signals above the resonance of the proof mass are of interest, force feedback cannot be used.

Once the resonant frequency of the mechanical system is chosen, (thereby setting the displacement and bandwidth of the mechanical system) it would appear, from equations (1) and (2), that the proof mass of an accelerometer can be reduced to an arbitrarily small value so long as the spring constant is reduced by a comparable amount. However, as the proof mass is reduced, thermal noise appears in the motion of the mass. This noise can be shown to be completely analogous to Johnson noise in a resistor. It gives rise to a frequency-independent, thermal-noise equivalent, acceleration, TNEA, of the support defined as $$TNEA = \sqrt{\frac{4k_B T \omega_o}{mQ}} \quad (3)$$

where m is the proof mass value, $\omega_o$ is the resonant frequency, $k_B$ is Boltzmann's constant, T is temperature, and Q is the quality factor of the mechanical system. That the TNEA is frequency independent, above as well as below $\omega_o$, is a consequence of the fact that the thermally-induced motion of the proof mass, and the acceleration response of the mechanical system ($x_r/a_s$) have identical frequency response. Therefore, their ratio (i.e., TNEA) is frequency independent. TNEA is simply the acceleration corresponding to the thermal motion of the proof mass. In the absence of other noise sources, it sets a lower limit on the acceleration that can be measured with the device.

Traditionally, accelerometer designers have avoided the effects of TNEA by using a large proof mass. However, lower damping (high Q) also could be used to reduce the TNEA for a given proof mass value and resonant frequency. Q can be increased by evacuating a can housing the accelerometer, thus reducing the viscous damping from the air.

Miniaturization of sensors has been enabled by the development of silicon micromachining technology, and miniature accelerometers have been described by a number of authors. However, to meet needs for low-cost high-performance, miniature accelerometers and displacement sensors, conventional transducer technologies relying on capacitive, optical, inductive, or piezo transducers often impose incompatible mass, volume, or power requirements. Thus, miniaturization requires new approaches. To achieve substantial reductions in size relative to conventional accelerometers, new position sensing techniques which are sensitive to extremely small displacements are required. Electron tunneling is such a technique.

Displacement transducers based on electron tunneling through a narrow vacuum or air barrier have been shown to offer high sensitivity which results from the exponential dependence of tunnel current on tunnel electrode spacing. For example, employing a tip similar to those used in Scanning Tunneling Microscopy (STM), an acceleration resolution of $10^{-5}$ g/$\sqrt{Hz}$ with a bandwidth of 3 kHz has been observed. A tunneling transducer similar to those of the accelerometers described below, coupled with a miniature Golay cell fabricated by silicon micromachining, has also been constructed as a high-sensitivity infrared detector.

In operation of a tunnel tip in an STM mode, a tunnel current I is established between a tip and a counterelectrode by a small voltage bias V. In typical STM operation, feedback circuitry controls the vertical position of the tip by means of a piezoelectric transducer so as to maintain the tunnel current constant, thereby also maintaining the electrode spacing s constant, while the specimen is scanned laterally. Tunnel current I depends on electrode spacing s as $$I \propto Ve^{-\alpha\sqrt{\phi}s} \qquad (4)$$

where $\phi=1.025\text{Å}^{-5}$ eV$^{-1/2}$, $\phi$ is the height of the tunnel barrier, and the bias voltage V is small compared to $\phi$. For typical values of $\phi$ and s (0.5 eV and 10Å, respectively), the current varies by a factor of two for each Å change in electrode separation. Because of this extreme sensitivity to position, the tip-to-substrate separation is maintained constant to high precision for lateral scanning over topography. The output of the feedback circuitry is also used as a measure of the tip's vertical position. The tunnel transducer's sensitivity to position is superior to that of other compact transducers and is orders of magnitude better than compact capacitive sensors, for example. Also, the sensitivity of a tunnel transducer is independent of device size because of the extremely small size of the tunneling tip. Thus, miniaturization of the transducer causes no reduction in sensitivity. Micromachining of silicon through the use of anisotropic etchants and doping to control etching allows fabrication of sensors completely from single crystal silicon, coupled with thin film deposition. Such micromachined silicon sensors take advantage of precision photolithography and batch processing to facilitate miniaturization and reduce fabrication costs.

A prototype single-element tunneling accelerometer has been fabricated from silicon utilizing a micromachined silicon tip coated with a gold electrode. One electrode of the electron tunneling circuit is mounted on a cantilever supported by a folded cantilever spring. The tunnel electrode gap is adjusted by electrostatic deflection of this cantilever. A feedback circuit maintains the desired tunnel current by controlling this electrostatic deflection. The variations in deflection voltage required to maintain constant tunnel current may be analysed to calculate the applied acceleration. Use of electrostatic deflection in a tunnel sensor is a marked improvement over piezoelectric actuators, as commonly used for tunneling microscopy. In contrast to piezoelectric devices, electrostatic actuators show virtually no hysteresis and drift, and are insensitive to temperature. The response of the electrostatic actuator is a function only of the geometry and mechanical properties of the device, whereas the response of piezoelectric actuators is also dependent on other material characteristics which may not be reproducible between devices and over time. Also, the electrostatic actuator may be readily incorporated into a microelectronic package in a batch fabricated process.

The silicon tip is formed directly on the silicon substrate, or alternatively, on the silicon proof mass, by undercutting a 60×60 micron square of $SiO_2$ with ethylenediamine pyrocatechol (EDP) etchant until the fragment of oxide is carried away, leaving a pyramidal tip. The cantilever area for this prototype is approximately 1 cm$^2$ with a mass of 30 mg. The measured spring constant is 60 N/m, giving a calculated natural frequency of 225 Hz.

The resolution of the device is determined by both the responsivity and the dominant noise sources. Since the measured noise includes contributions from the laboratory, the fundamental noise of the sensor may be less. The measured current noise at 10 Hz and 1 kHz is approximately $2.3\times10^{-12}$ and $2.5\times10^{-13}$ A/$\sqrt{\text{Hz}}$, respectively, for an operating current of 1.3 nA and bias of 100 mV. This noise was measured with a feedback loop bandwidth less than 0.1 Hz, in order to prevent the feedback loop from autocorrecting for the noise in the tunnel current above that frequency. Utilizing determinations of the tunnel transducer displacement responsivity of 0.94 nA/Å, the displacement resolution of the tunnel transducer is $2.4\times10^{-3}$ and $2.7\times10^{-4}$ Å/$\sqrt{\text{Hz}}$ at 10 Hz and 1 kHz, respectively. The corresponding acceleration resolutions of the sensor system are $5\times10^{-8}$ and $1.2\times10^{-7}$ g/$\sqrt{\text{Hz}}$ (below the natural frequency of the suspended mass, the system resolution is different than the tunnel transducer resolution; they are related through the second part of Equation 6 below). The actual resolution of the sensor may be greater, since the measured noise includes contributions from the laboratory. This sensitivity is several orders of magnitude better than conventional compact accelerometers. For the above prototype, the proof mass position relative to the counterelectrode is controlled and held constant by the feedback control system. The transducer signal is derived from the electrostatic force required to maintain its position relative to the counterelectrode. Stable operation of the feedback circuitry is restricted to frequencies below the natural frequency of the suspended proof mass, about 225 Hz for this device. However, many applications require a larger bandwidth.

Prior art in the form of issued U.S. Patents relevant to the present invention in varying degrees, includes the following:

U.S. Pat. No. 4,675,670 to Lalonde et al is directed to an apparatus for the dynamic and non-contact measurement of small distances using two conductive plates that are parallel, superimposed and electrically insulated from one another and using circuitry to measure a current between these plates and a conductive surface that is an inverse function of the distance to be measured. The circuitry includes a generator supplying up to 100 MHz and up to 100 Volts. The apparatus shown for measuring the air gap in a rotary machine has sensor 7 comprising plates 9 and 11 separated by insulation 13 mounted on and insulated from surface 3. The signal generator supplies the fixed capacitor between the plates and the variable capacitor between plate 11 and surface 5 with a high frequency signal. Circuitry 19 detects the resultant current which is inversely proportional to the distance and circuitry 21 processes the signal by biasing and linearizing the current signal to provide a distance signal.

U.S. Pat. No. 5,008,774 to Bullis et al is directed to a capacitive accelerometer with mid-plane proof mass adapted to register acceleration coaxial with axis 230. The apparatus has a three plate capacitor with rigid top and bottom plates 20, 30 and hinged proof mass 110 comprised of two silicon slabs 112, 114 with a conductive interface region 115. This micromachined unit is connected to the electronic portion 310 made of straightforward circuits to sense capacitance by monitoring the unbalance of the high frequency bridge circuit of which the three plate capacitor forms a part.

U.S. Pat. No. 3,723,866 to Michaud et al is directed to a movement measuring sensor comprising a rule having parallel surfaces and a slider having parallel surfaces opposite to the first parallel surfaces and movable relatively to the rule in a direction parallel to the surfaces. The surfaces have conductive strips to form two capacitors in a series relationship. This rule 10 for measuring to an accuracy of 0.1 micron is read by determining the value of capacitance between the rule and the slider and it is preferable to use the indirect method to determine the value of the capacitor, indirect methods being more accurate than direct methods. The voltage method using a high frequency generator operating in the megahertz range to energize the circuit is preferable to the non-linear oscillator method.

U.S. Pat. No. 4,823,230 to Tiemann is directed to a pressure-to-capacitance transducer of the deflecting membrane type having increased dynamic range. The transducer 10 fabricated of a non-conductive material such as ceramic or a semiconductor substrate 10-1 has a first conductive electrode 11 formed on the surface of the substrate. A first insulator material 12 is fabricated over the electrode 11 and an insulating wall 14 fabricated upon the substrate 10-1 enclosing the entire transducer area. A second electrode 18 of thin film elastically-deflecting conductive material is fabricated in attachment to the wall top portion so as to complete a pressure-tight cavity 10c. This cavity is filled with a reference volume of a reference gas at a reference pressure to give the physical characteristics desired to the transducer. The capacitance between the first electrode 11 and second electrode 18 can be measured by electronic circuitry—it will be understood that this circuitry can be integrated into the substrate 10-1.

U.S. Pat. No. 4,364,008 to Jacques is directed to a moisture measuring device 10 comprising a microwave generator 12 operating between 100 MHz and 20 GHz, a resonant cavity guiding means 14, typically a coaxial cable and a probe 16 in several embodiments, some with switching provided manually or by computer 22. The Shottky diode detector 18 provides the moisture signal through the dc circuit 20 to the computer 22.

Other relevant prior art includes the following:

Binnig, G. and Rohrer, H., 1986, "Scanning Tunneling Microscopy," IBM J. Research and Development, Vol. 30, pp. 355–369.

Chen, P., Muller, R. S., Shiosaki, T., and White, R. M., 1979 "Silicon Cantilever Beam Accelerometer Utilizing a PI-FET Capacitive Transducer," IEEE Transactions on Electron Devices, Vol. 26, pp. 1857–1858.

Cole, J. C., 1991, "A New Sense Element Technology for Accelerometer Subsystems," Technical Digest of the International Conference on Solid-State Sensors and Actuators, Transducers '91, IEEE, Piscataway, N.J., pp. 93–96.

de Bruin, D. W., Allen, H. V., and Terry, S. C., 1990, "Second-order Effects in Self-Testable Accelerometers," Technical Digest of the IEEE Solid State Sensor and Actuator Workshop (Hilton Head), IEEE, N.Y., pp. 149–152.

Eller, E. E., and Whittier, R. M., 1976, "Piezoelectric and Piezoresistive Transducers," Shock and Vibration Handbook, C. M. Harris and C. E. Crede, ed., McGraw-Hill, N.Y., Ch. 12, pp. 1–27.

Frobenius, W. D., Zeitman, S. A. White, M. H., O'Sullivan, D. D., and Hamel, R. G., 1972, "Microminiature Ganged Threshold Accelerometers Compatible with Integrated Circuit Technology," IEEE Transactions on Electron Devices, Vol. 19, pp. 37–40.

Gabrielson, T. B., 1991, "Mechanical-Thermal Noise in Micromachined Acoustic and Vibration Sensors," submitted to IEEE Transactions on Electron Devices.

Henrion, W., DiSanza, L., Ip, M., Terry, S., and Jerman, H., 1990, Technical Digest of the IEEE Solid State Sensor and Actuator Workshop (Hilton Head), IEEE, N.Y., pp. 153–156.

Kenny, T. W., Kaiser, W. J., Waltman, S. B., and Reynolds, J. K., 1991, "Novel Infrared Detector Based on a Tunneling Displacement Transducer," Applied Physics Letters, Vol. 59, pp. 1820–1822.

Kenny, T. W., Waltman, S. B., Reynolds, J. K., and Kaiser, W. J., 1991, "Micromachined Silicon Tunnel Sensor for Motion Detection," Applied Physics Letters, Vol. 58, pp. 100–102.

Marton, L., and Hornyak, W. F., 1969, Methods of Experimental Physics, Academic Press, N.Y., Vol. 8.

Peeters, E., Vergote, S., Puers, B., Sansen, W., and Leuven, K. U., 1991 "A Highly Symmetrical Capacitive Micro-Accelerometer with Single Degree-of-Freedom Response," Technical Digest of the International Conference on Solid-State Sensors and Actuators, Transducers '91, IEEE, Piscataway, N.J., pp. 97–100.

Petersen, K. E., Shartel, A., and Raley, N. F., 1982, "Micromechanical Accelerometer Integrated with MOS Detection Circuitry," IEEE Transactions on Electron Devices, Vol. 29, pp. 23–27.

Roylance, L. M., and Angell, J. B., 1979, "A Batch-Fabricated Silicon Accelerometer," IEEE Transactions on Electron Devices, Vol. 26, pp. 1911–1917.

Rudolf, F., "A Micromechanical Capacitive Accelerometer with a Two-Point Inertial-Mass Suspension," Sensors and Actuators, Vol. 4, pp. 191–198.

Waltman, S. B., and Kaiser, W. J., 1989, "An Electron Tunneling Sensor," Sensors and Actuators, Vol. 19, pp. 201–210.

STATEMENT OF INVENTION

A number of motion sensors, including accelerometers and seismometers, use a damped, spring supported proof mass as a mechanical transducer. As the entire sensor is moved, there is a displacement of the proof mass relative to the support structure. In an acceleration to displacement system, the instrument is operated at frequencies below the natural resonant frequency of the mechanical support, given by:

$$\omega_o = \sqrt{\frac{k}{m}} \tag{5}$$

where k is the spring's force constant and m is the proof mass value. In this case the relative displacement of the proof mass is proportional to the acceleration applied to the device, with the constant of proportionality being $1/\omega^2_o$. This constant is called the responsivity (relative displacement per unit acceleration of the device) of the mechanical transducer.

It would appear that, in the interest of reducing the total sensor mass, the proof mass value could be decreased to an arbitrarily low value, so long as the spring constant is reduced by a similar amount, thus maintaining $1/\omega^2_o$ constant. In practice, however, the amount to which m can be reduced is limited by thermal noise in the system. Thermal energy is transferred to the proof mass, and its thermal induced motion sets a lower limit on the measurable relative displacement. Correspondingly, this motion sets a lower limit on acceleration that can be measured by the system. This minimum measurable acceleration is the Thermal Noise Equivalent Acceleration (TNEA), previously defined.

In addition, requirements for linearity and dynamic range often necessitate the use of force feedback control of the transducer. Such control may be implemented through feedback of the position of the proof mass at frequencies below its resonance. High-sensitivity accelerometers often require the use of low (<200 Hz) resonant frequencies. However, signals at frequencies higher than this are often of interest, in which case force feedback cannot be applied to the proof mass. On the other hand, wide bandwidth implies a stiff feedback control actuator having a high natural resonant frequency, which as shown above, implies low responsivity. In the common single-element design, the feedback control actuator and the suspended proof mass system are the same: that is, they are combined.

In the present invention, a new dual-element design incorporates independently suspended proof mass and transducer so that their mechanical properties can be independently tailored. This invention gives the ability to separate the feedback control problem from the proof mass suspension, allows wide bandwidth, and allows large dynamic range. Thus, a cantilever/transducer with a high mechanical resonant frequency is controlled to closely follow the motion of a proof mass. In this dual-element design, the proof mass can have a relatively low resonant frequency which is within the band of interest, so there is much more design flexibility than with the earlier single-element prototype. In the design of this new dual-element accelerometer, a wide-bandwidth (e.g., 10 kHz), low-mass (9 µg) cantilever is used to track the motion of a small proof mass (100 mg) with an intermediate-frequency resonance (100 Hz). These parameters were chosen after extensive theoretical modeling to assess the role of thermodynamic noise, shot noise, Johnson noise and amplifier noise. With these mechanical characteristics selected, a dual-axis accelerometer with total volume of <0.5 in.$^3$ and sensitivity of $10^{-8}$ g/$\sqrt{Hz}$ from 5 Hz to 5 kHz is being built.

In one embodiment of the present invention, electron tunneling is used as an extremely high resolution displacement sensor. In this device, the cantilever is deflected by electrostatic forces until the tunneling tip is within 10Å of the proof mass. When the tunneling bias voltage is applied, a tunneling current of ≈1 nA is measured. A feedback loop is activated to measure this current and compare it to a reference value. Deviations in tunnel current from a setpoint result in feedback-controlled adjustments in the deflection voltage. These variations in deflection voltage are then recorded as measurements of variations in proof mass position.

Several important applications of this accelerometer already exist, including detection of underwater acoustics, detection of vibrations for vehicle health monitoring, detection of seismic signals, underground resource exploration, active vibration cancellation, and others.

The present invention represents a significant improvement over conventional high sensitivity motion sensors. The technology demonstrated here is widely applicable to a large number of sensor technologies, including, but not limited to, seismometers, accelerometers, and magnetometers. Also it is an enabling technology, which should allow miniaturization of any, or all of these devices.

OBJECTS OF THE INVENTION

It is therefore a principal object of the present invention to provide a robust, miniature, high sensitivity accelerometer having a high dynamic measurement range and providing operation over a wide bandwidth.

It is an additional object of the invention to provide a dual-element electron tunneling accelerometer having a resolution of at least $10^{-8}$ g/Hz$^{1/2}$ in a 600 Hz band and at least $10^{-6}$ g/Hz$^{1/2}$ at 5 kHz.

It is an additional object of the invention to provide an accelerometer having a proof mass of less than 1 gram and an acceleration resolution of $10^{-6}$ g/Hz$^{-1/2}$ over a bandwidth of 5 Hz to 10 kHz.

It is still an additional object of the invention to provide a dual-element ultra-compact accelerometer utilizing a proof mass on the order of 100 milligrams or less and having a resonant frequency on the order 100 Hz or greater and a resulting accelerometer resolution approaching $10^{-9}$ g/$\sqrt{Hz}$ in a 300 Hz band.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
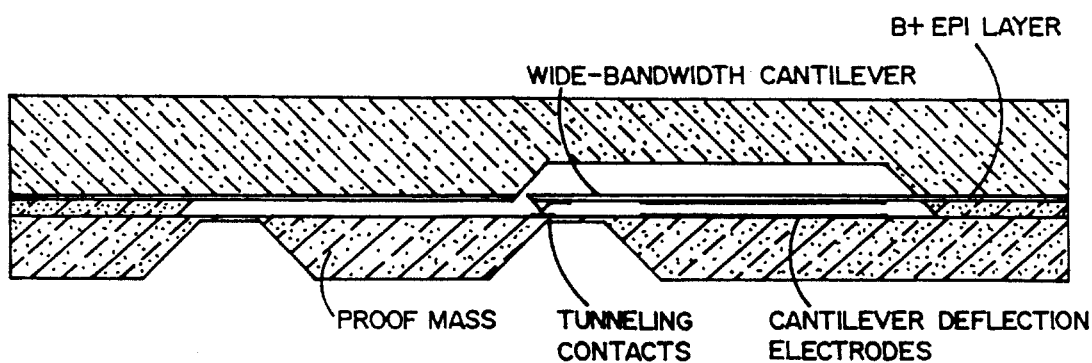
FIG. 1 is a schematic drawing of a dual-element electron tunneling accelerometer of the present invention.

FIG. 1 is a schematic illustration of a dual-element electron tunneling accelerometer design in accordance with a preferred embodiment of the invention. In the design of this accelerometer, a wide-bandwidth (10 kHz), low-mass (9 µg) cantilever is used to track the motion of a small proof mass (100 mg) with an intermediate-frequency resonance (100 Hz). These parameters were chosen after extensive theoretical modeling to assess the role of thermodynamic noise, shot noise, Johnson noise and amplifier noise. With these mechanical characteristics selected, a dual-axis accelerometer with total volume of <0.5 in.$^3$ and sensitivity of $10^{-8}$ g/$\sqrt{Hz}$ from 5 Hz to 500 Hz and from $10^{-8}$ to $10^{-6}$ g/$\sqrt{Hz}$ from 500 Hz to 5 kHz is being built.

In this device, the cantilever is deflected by electrostatic forces between the cantilever deflection electrodes until the electrode on the tunneling tip is within 10Å of the electrode on the proof mass. When the tunneling bias voltage is applied, a tunneling current of ≈1 nA is measured. A feedback loop is activated to measure this current and compare it to a reference value. Deviations in tunnel current from a setpoint result in feedback-controlled adjustments in the deflection voltage.

Figure 4:
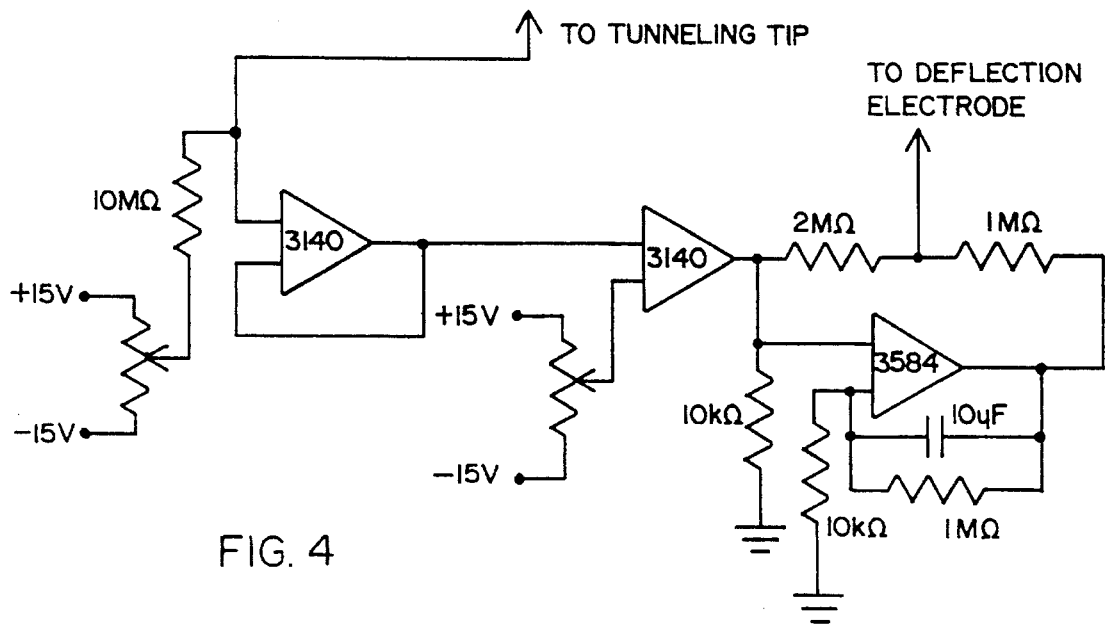
FIG. 4 is a schematic of a feedback circuit for controlling the tunneling contact spacing of the invention.

These variations in deflection voltage are then recorded as measurements of variations in proof mass position. The boron-doped (B+) epitaxial silicon layer serves as an etch-stop during micromachining, and may also used for the wide-bandwidth cantilever. A wide-bandwidth cantilever is used to follow the motion of a narrower bandwidth proof mass oscillator. The tunnel circuit feedback control shown in FIG. 4 is applied to the cantilever deflection electrodes.

Figure 2:
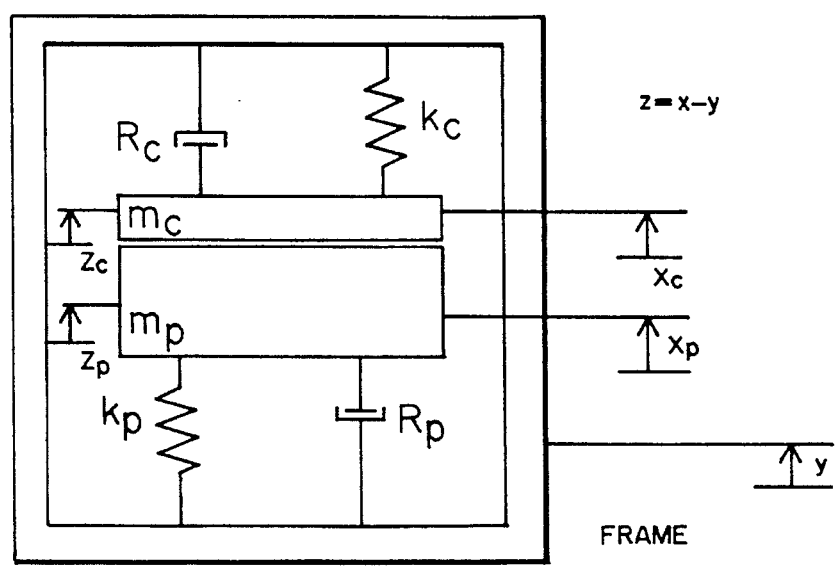
FIG. 2 is a schematic illustration of a two-mass system used to analyze noise sources in the dual-element design of the invention.

We have analyzed noise sources for a dual-element design, represented by the mass-suspension system in FIG. 2. FIG. 2 is a schematic illustration of a two-mass system with spring constants $k_p$ and $k_c$ and damping coefficients $R_p$ and $R_c$. The proof mass $m_p$ and cantilever mass $m_c$ are suspended independently from the frame. The relations between the mass motions and the frame motion can be obtained by solving the equations of motion when the frame is subjected to a sinusoidal driving force. From the steady-state solutions for each mass, the relations between the rms amplitude Y of the frame motion and the rms amplitudes $Z_p$ and $Z_c$ for the masses relative to the frame are $$Z_c = \frac{Y\Omega_c^2}{\sqrt{(1-\Omega_c^2)^2 + \frac{\Omega_c^2}{Q_c^2}}} \text{ and } Z_p = \frac{Y\Omega_p^2}{\sqrt{(1-\Omega_p^2)^2 + \frac{\Omega_p^2}{Q_p^2}}} \quad (6)$$

where $\Omega_p = \omega/\omega_{op}$, $Q_p = m_p\omega_{op}/R_p$, $\Omega_c = \omega/\omega_{oc}$, and $Q_c = m_c\omega_{oc}/R_c$.

From the relative displacement $Z \equiv Z_c - Z_p$ of the two independently-suspended masses, the rms amplitude of relative motion is $$Z(rms) = \sqrt{Z_c^2 + Z_p^2 - 2Z_cZ_p\cos(\phi_c - \phi_p)} \quad (7)$$

where $$\phi_c = \tan^{-1}\frac{\omega\omega_{oc}}{(\omega_{oc}^2 - \omega^2)Q_c} \text{ and } \phi_p = \tan^{-1}\frac{\omega\omega_{op}}{(\omega_{op}^2 - \omega^2)Q_p} \quad (8)$$

The transfer function between the measured motion Z and the desired frame motion Y is given by Equations 6–8. The frequency range of interest is $\omega \ll \omega_{oc}$, that is, frequencies less than the natural frequency of the cantilever. By design, the proof mass natural frequency is small compared to the cantilever natural frequency, so $\Omega_c \ll \Omega_p$ and, accordingly, $Z_c \ll Z_p$. Thus, in the band of interest, the transfer function is approximately $$Z \approx \frac{Y\Omega_p^2}{\sqrt{(1-\Omega_p^2)^2 + \frac{\Omega_p^2}{Q_p^2}}} \quad (9)$$

The suspended masses are subject to thermal noise which may be included in the equation of motion as a force $F(rms) = \sqrt{4k_BTR}$ N/√Hz; this is the Nyquist relation for a mass-spring oscillator with damping coefficient R. The steady-state solutions for thermal noise at frequency w are oscillations with rms amplitudes $$Z_{np} = \sqrt{\frac{4k_BT}{\omega_{op}k_pQ_p\left[(1-\Omega_p^2)^2 + \frac{\Omega_p^2}{Q_p^2}\right]}} \quad (10)$$

$$Z_{nc} = \sqrt{\frac{4k_BT}{\omega_{oc}k_cQ_c\left[(1-\Omega_c^2)^2 + \frac{\Omega_c^2}{Q_c^2}\right]}}$$

Using Equation 9, the frame-equivalent rms noise terms are $$Y_{np} \approx \frac{1}{\omega^2}\sqrt{\frac{4k_BT\omega_{op}}{m_pQ_p}} \text{ and}$$

$$Y_{nc} \approx \frac{1}{\Omega_p^2}\sqrt{\frac{4k_BT\left[(1-\Omega_p^2)^2 + \frac{\Omega_p^2}{Q_p^2}\right]}{\omega_{oc}k_cQ_c\left[(1-\Omega_c^2)^2 + \frac{\Omega_c^2}{Q_c^2}\right]}} \quad (11)$$

where the subscripts c and p refer to parameters of the cantilever and the proof mass.

From the shot noise expression $I_n = \sqrt{2eI}$ Amps/√Hz, coupled with the tunnel current relation, the frame-equivalent shot noise in the tunnel current I is $$Y_{ns} \approx \frac{1}{\Omega_p^2}\sqrt{\frac{2e}{I\Phi\alpha^2}}\sqrt{\left((1-\Omega_p^2)^2 + \frac{\Omega_p^2}{Q_p^2}\right)} \quad (12)$$

where $\phi$ and $\alpha$ were defined earlier for the tunnel tip. Johnson noise in the tunneling process arises from the zero-bias interchange of electrons across the gap, and is independent of bias. For a tunnel current of 1 nA at a tip bias of 100 mV, the frame-equivalent Johnson noise is 0.7 times the shot noise given by Equation 12. Johnson noise at the first resistor in the electronic circuit, typically 10 MΩ, is a factor of 4 less than the tunnel current shot noise. Because of the large responsivity of the tunnel transducer, amplifier noise is unimportant.

Figure 3:
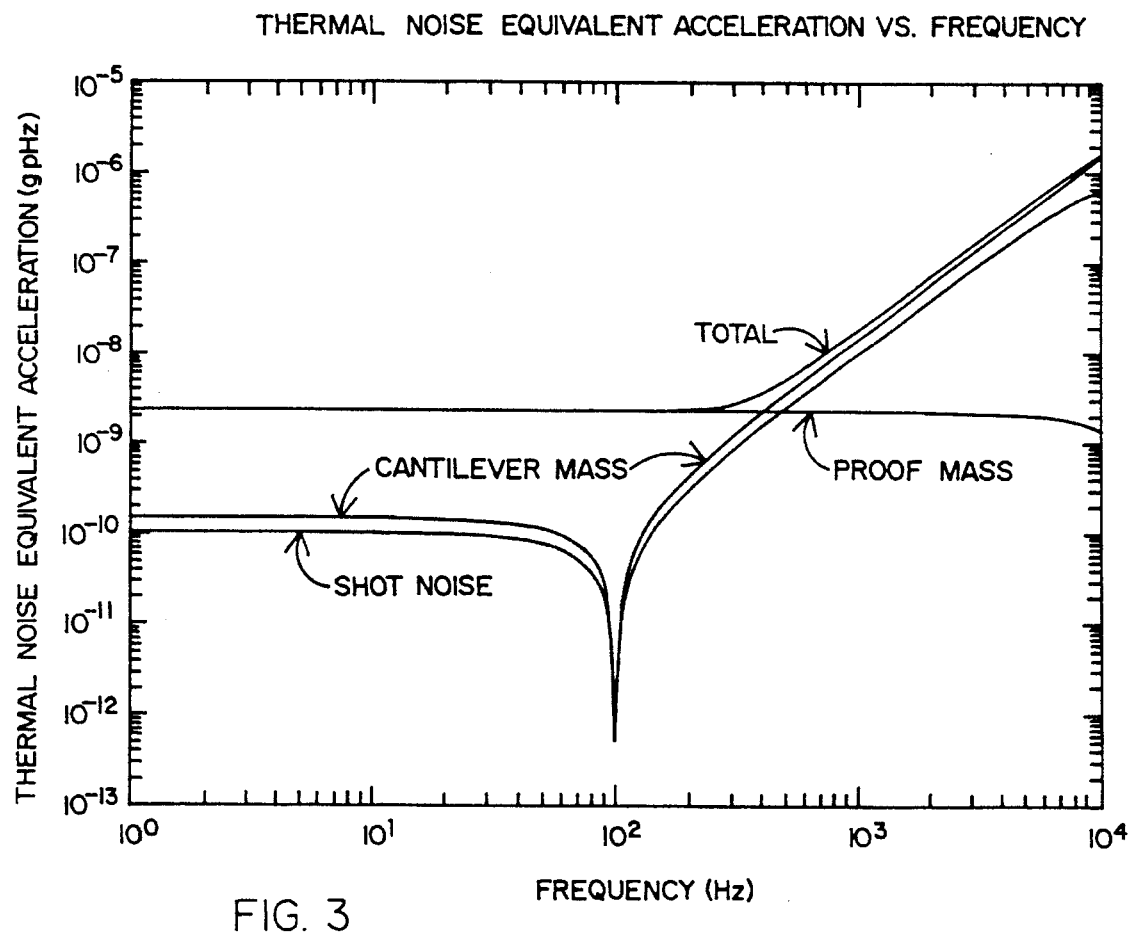
FIG. 3 is a graphical representation of theoretical spectral distributions of thermal noise and shot noise in the dual-element system.

FIG. 3 illustrates the theoretical spectral distributions of thermal noise for the proof and cantilever masses and of shot noise for a dual-element system referred to the frame.

The theoretical frame-equivalent noise spectra shown in FIG. 3 are for a 100 mg proof mass with a 100 Hz natural frequency, and a 9 microgram cantilever with a 16 kHz natural frequency. For this figure, a Q of 200 has been chosen for both elements. Shot noise is calculated for a tunnel current of 1 nA. These spectra are expressed as displacements referred to the sensor case, which can be readily converted to accelerations by multiplying by $\omega^2$. In the frequency range up to 300 Hz, the noise graph of FIG. 3 corresponds to an acceleration resolution of $2.4\times10^{-9}$ g/√Hz (independent of frequency). The dips at 100 Hz for shot noise and cantilever thermal noise result from cantilever-based noise being referred to the sensor case via the proof mass.

Thermal noise in the two suspended mass components is the dominant noise source limiting sensitivity for a compact accelerometer; for all frequencies, shot noise is less than the sum of the two mass thermal noises. For frequencies of less than about 300 Hz, thermal noise of the proof mass dominates, decreasing as $1/f^2$, while at higher frequencies thermal noise of the cantilever follower dominates, being roughly independent of frequency between the two natural frequencies. It should be noted that both thermal noise components can be readily reduced by increasing Q and/or by increasing the masses. As Equation 11 shows, the low frequency thermal noise is determined by the factor $\sqrt{mQ/f_o}$ for the proof mass, with lower noise resulting from larger mQ product and smaller natural frequency $f_o$. Small $f_o$ can be undesirable, however, because this corresponds to a small spring constant and would result in large deflections which are unsuitable for this structure. Cantilever noise between the two natural frequencies can be reduced by increasing the factor $\sqrt{f_{oc}k_cQ_c}$; particularly by increasing the cantilever spring constant, for example. As the size of a tunnel accelerometer is largely dictated by the size of the proof mass, applications requiring high sensitivity and small mass or volume may require Q>1 as for the illustration of FIG. 3, which introduces a peak in the Z/Y transfer function at the proof mass resonance. If this resonance is within the frequency band of interest, techniques to accommodate it must be utilized. Such techniques include straightforward signal processing or utilization of a pair of detectors with different resonant frequencies for each axis of motion. To obtain the sensitivity described here for a miniature sensor, particularly for frequencies above a few hundred Hz, compact position sensors capable of measuring $10^{-4}$ Å/√Hz are required. A tunnel sensor is necessary to satisfy these requirements.

FIG. 4 shows a typical feedback circuit that has been used to control tunneling between a micromachined tip and the remaining tunneling contact.

A voltage drop across a 10 MOhm resistor in series with the tip occurs whenever tunneling occurs. A low noise FET input operational amplifier in follower configuration is used to lower the source impedance. In this configuration, the output of the first preamplifier never exceeds the range between the bias voltage of 150 mV and ground. We have found this preamplifier configuration to be more stable than other possible circuits, such as virtual ground configuration which drives the preamplifier all the way to the supply voltage in the event of a tip contact. A simple op-amp circuit is then used to compare the preamplifier output with a reference input and generate an error signal. This low-voltage, wide-bandwidth error signal must then be added to a high-voltage, narrow-bandwidth offset to produce the voltage which is applied to the deflection electrodes. The high voltage signal may be generated by a power supply which is periodically adjusted to keep the error signal near zero. A simple high voltage amplifier circuit with very low bandwidth can perform this function as well.

CONCLUSION

Electron tunneling displacement transducers offer high position sensitivity which can be adapted to miniature micromachined silicon accelerometers. A single-element tunnel accelerometer, combining the proof mass and the electronic transducer, gives a resolution of $10^{-7}$ g/$\sqrt{Hz}$ for stable operation below the 225 Hz resonant frequency. A new dual-element system, with a low frequency proof mass oscillator and a high frequency cantilever transducer, provides flexibility for independently optimizing the proof mass oscillator system and the transducer. Thermal noise analysis is crucial for compact accelerometers with small proof masses. Analysis for a system with a proof mass of 100 mg and a resonant frequency of 100 Hz shows that the dominant noise source (particularly below 300 Hz) is thermal noise in the suspended masses; electronic noise is smaller. This analysis shows that compact, high-resolution devices utilizing electron tunneling sensors are feasible. An acceleration resolution better than $10^{-6}$ g/$\sqrt{Hz}$ at 5 KHz, and better than $10^{-8}$ g/$\sqrt{Hz}$ in a 600 Hz band, is predicted for the dual element device. Electron tunnel sensors are necessary for these high resolutions in a compact sensor.

Having thus described an exemplary embodiment of our invention, what we claim is:

1. An electron tunneling sensor comprising:

a first moveable element the movement of which is responsive to a sensed parameter, said first moveable element having a first tunneling electrode affixed thereto for movement therewith;

a second moveable element physically independent of said first moveable element, the movement of said second moveable element being selectively controlled, said second moveable element having a second tunneling electrode affixed thereto for movement therewith; and means for establishing and maintaining a constant tunneling current between said first and second tunneling electrode by moving said second moveable element relative to said first moveable element to maintain a constant spacing between said first and second tunneling electrodes;

said means providing an output indicative of the relative movement of said first and second moveable elements;

said second moveable element having a resonant frequency which is at least ten times the resonant frequency of said first moveable element.

2. An accelerometer comprising:

a proof mass positioned by an elastic suspension relative to a frame for deflection when subjected to acceleration;

a first electron tunneling electrode affixed to said proof mass for movement therewith; and a cantilever positioned adjacent to but separated from said proof mass and said elastic suspension and having a second electron tunneling electrode aligned with said first electrode and spaced therefrom for permitting a tunneling current between said electrodes;

said elastically suspended proof mass and said cantilever being mechanically independent of one another, said tunneling current being indicative of the separation between said first and second electron tunneling electrodes and thus indicating the deflection of said proof mass;

said cantilever having a resonant frequency which is ten to one hundred sixty times the resonant frequency of said proof mass and elastic suspension.

* * * * *